April 20, 1943.  H. PITTET  2,316,987
ELECTRIC DEVICE FOR DISTANT INDICATION
Filed March 6, 1941  2 Sheets-Sheet 1
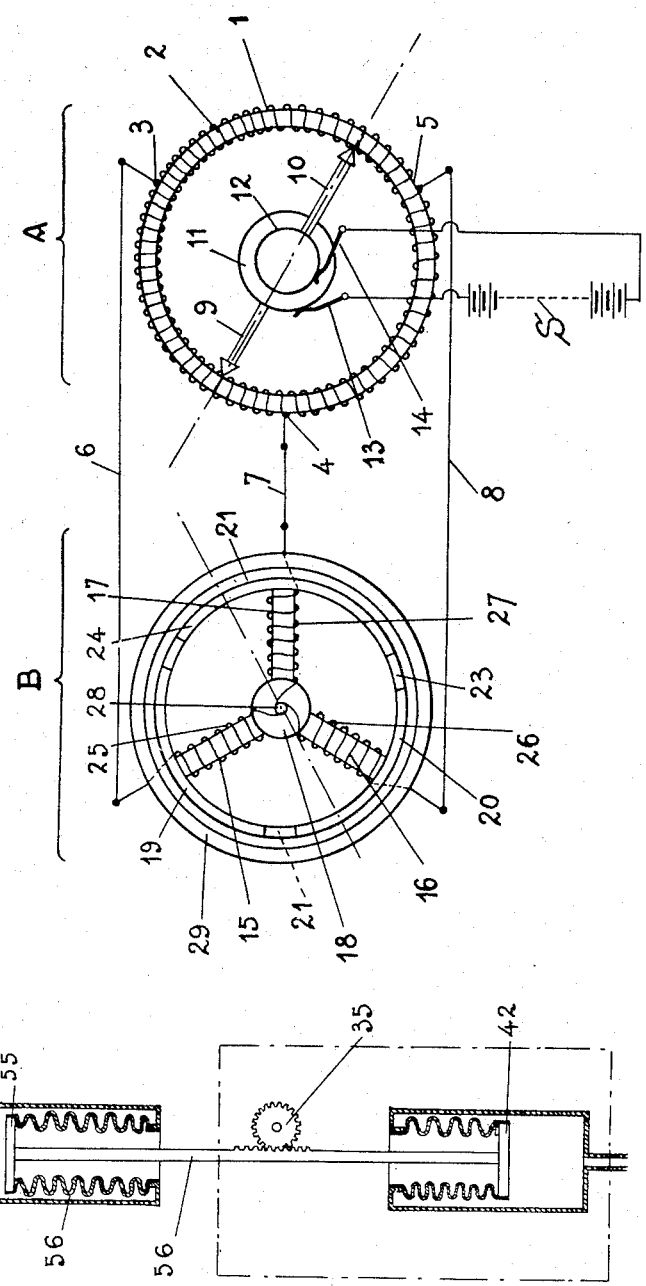
INVENTOR:
HENRI PITTET
BY Haseltine, Lake & Co.
ATTORNEYS

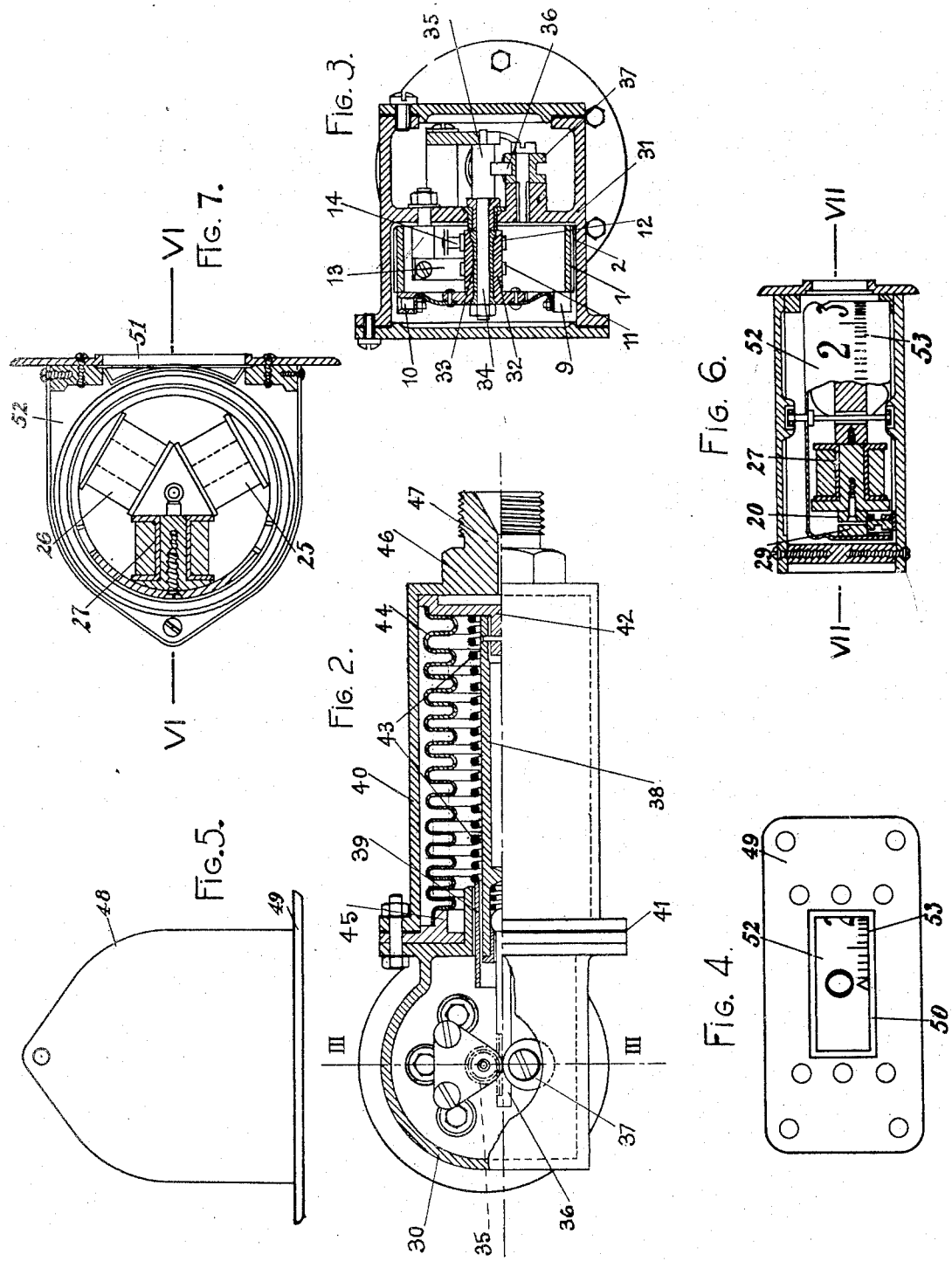

Patented Apr. 20, 1943

2,316,987

UNITED STATES PATENT OFFICE 2,316,987

ELECTRIC DEVICE FOR DISTANT INDICATION

Henri Pittet, Blere-La-Croix, France; vested in the Alien Property Custodian

Application March 6, 1941, Serial No. 382,037
In France February 14, 1940

3 Claims. (Cl. 177—351)

Electric devices for distant indication are already known the transmitter of which is constituted by a closed torus-shaped winding cooperating with two rotary diametrally opposed brushes, respectively connected to the two poles of a source of direct current, said winding comprising three equidistant current intakes which conducting wires respectively connect to three windings of the receiver, mounted as a star-connection on three uniformly arranged radial cores, the resultant magnetic field of which orientates a movable polarized unit. Said movable unit of the receiver theoretically takes, at every instant, a position which corresponds to that of the diametrally opposed rotary brushes of the transmitter.

In the already known devices of this kind, the polarized movable unit of the receiver is constituted by a magnetized rectilinear bar (or a magnetized needle) which pivots within the cylindrical space formed by the pole-pieces terminating the cores of the windings. This arrangement has inconveniences which the present invention is adapted to remedy; in particular, the energy of a magnetized needle or of a small magnetized bar is small; moreover, its magnetic axis is not perfectly defined. Finally, these inconveniences are increased owing to the small dimensions of said bar or of said needle, which must rotate within the cylinder formed by the pole-pieces.

For avoiding said inconveniences, the invention is mainly characterised by the fact that the polarizing magnet of the movable unit of the receiver is a ring magnetized according to one of its diameters, said ring rotating outside the cylinder formed by the pole-pieces.

The ring thus constitutes a magnet of important cross section and large diameter, the energy of which is sufficiently great and the magnetic axis of which is perfectly defined, owing to the magnetic opposition of the two halves of the torus, on either side of the said axis. Owing to said ring-shaped magnet, the movement of the movable unit takes place not by jerks, but continuously which eliminates any divergence greater than one degree per revolution of the unit between the angular position of the brushes of the transmitter and the corresponding angular position of the movable annular magnet of the receiver.

The electric device for distant indication which has just been briefly described above, can receive any applications (distant measurements, distant control, etc.) necessitating low transmitting power, the voltage of the source of direct current supplying the device being capable of varying to any extent without affecting the accuracy of the device.

Among the applications of said device can be cited an indicator for the distant indication of the oil pressure of an aeroplane engine, which indicator, owing to the absence of any pipings avoids any risk of oil leakage.

The pressure indicator in question comprises:

A transmitter formed by the combination of the above described electric transmitter with a driving member subjected, on the one hand to the action of the pressure to be measured and, on the other hand, to that of a restoring spring, said member being, for instance, a piston subjected to the action of the pressure to be measured and to that of a restoring spring, said piston being combined with the end of a fluid-tight bellows the other end of which is secured to one of the bottoms of a cylinder in which moves the above mentioned piston and which communicates with the pipe-line delivering oil to the engine;

A receiver connected by means of three wires to the above mentioned electric transmitter, the movable unit of said receiver being constituted by a drum which is rigid with the movable unit (annular magnet) and which bears a scale graduated in units of pressure, which graduation moves in front of an index and is visible through an aperture provided in the case of the receiver.

The bellows device previously indicated can be provided in double, in order to shelter the entire mechanism from the variations of atmospheric pressure.

In the accompanying drawings have been diagrammatically shown, on the one hand, the fundamental means of the new electric device for transmitting indications to a distance and, on the other hand, an embodiment of an indicator for the distant indication of oil pressure to which is applied the general means above specified.

Fig. 1 is a diagram of the general means constituting the electric device for distant indication;

Fig. 2 is a partial longitudinal section of the transmitter of an indicator for the distant indication of oil pressure;

Fig. 3 is a section made according to line III—III of Fig. 2;

Fig. 4 is a front view of the case of the receiver of the distant indicator;

Fig. 5 is a plan view thereof;

Fig. 6 is a partial vertical section made according to line VI—VI of Fig. 7;

Fig. 7 is a partial section made according to line VII—VII of Fig. 6;

Finally, Fig. 8 very diagrammatically shows a modification of the device of Figs. 2 and 3, modification in which the action of atmospheric pressure is eliminated.

As shown in the diagram of Fig. 1, the device for transmitting to a distance comprises a transmitter A connected by means of three wires to a receiver B.

The transmitter A comprises a regular torus-shaped winding closed on itself, which is supported by a fixed insulating ring 2, said torus-shaped winding comprising three current intakes 3, 4 and 5 offset to the extent of 120° from each other and respectively connected to the wires 6, 7 and 8 leading to the receiver B.

With the torus-shaped winding 1 cooperate two movable brushes 9 and 10 diametrally opposed to each other and connected to rings supplying current 11 and 12 on which rub brushes 13 and 14 connected to a source of direct current S.

The receiver B comprises a fixed part formed of three radiating cores 15, 16 and 17 offset to the extent of 120° from each other, connected to a central portion 18 and carrying flared pole-pieces 19, 20 and 21, the whole structure of which forms a kind of annulus the segments of which are separated from each other by oblique saw-cuts (magnetic joints) 22, 23 and 24.

On the cores 15, 16 and 17 are arranged the windings 25, 26 and 27 which are star-connected, that is to say comprising a common central connection 28 and respectively connected to the wires 6, 7 and 8.

The movable unit of the receiver is constituted by a magnet 29 in the form of a closed ring, said magnet 29 being arranged with a small air-gap about the annulus constituted by the pole-pieces 19, 20 and 21.

Owing to the oblique magnetic joints 22, 23 and 24, on the one hand, and owing to the magnet 29 in the shape of a closed ring, on the other hand, said magnet moves without jerks and occupies, relatively to the fixed system, an angular position which corresponds (with a divergence smaller than one degree) to the angular position of the movable unit of the transmitter.

The distant indicator of oil pressure shown in Figs. 2 to 7 comprises a transmitter (Figs. 2 and 3) and a receiver (Figs. 4 to 7).

The transmitter is constituted by a first case 30 enclosing the electric transmitter A of Fig. 1.

As will be more clearly seen in Fig. 3, the case 30 is divided by a partition 31 into two compartments, one of which (the left-hand one in Fig. 3) encloses the torus-shaped winding 1 (wound on the annular support 2), winding with which cooperate the brushes 9 and 10 which, in the present case, are constituted by rollers (for reducing the friction and, consequently, the "hysteresis" of the system), said brushes being supported by an insulating member 32 threaded on a socket 33 rigid with the rotary shaft 34. The brushes 9 and 10 are connected to the rings 11 and 12 receiving the current from the brushes 13 and 14 to which lead wires connected to the source of current not shown in the drawings.

The rotary shaft 34 comprises, in the other compartment, a toothed portion 35 forming pinion with which meshes a rack 36 held against said pinion by means of an adjustable eccentric guide 37.

The rack 36 is resiliently connected to a hollow piston rod 38 passing through a guide 39 secured in the bottom of a cylindrical case 40 connected to the case 30 by means of the fluid-tight packing 41.

The end of the piston rod 38 opposed to that carrying the rack 36 is rigid with a piston 42 subjected to the action of a restoring spring 43 taking a bearing on the guide 39. The periphery of the piston 42 is moreover connected in a fluid-tight manner to one end of a bellows 44 the other end of which is connected, in a fluid-tight manner to the cylinder bottom 45 opposed to the cylinder bottom 46 which carries the connecting nozzle 47 adapted to be connected to the delivery side of the oil pump.

The operation of said transmitter is easy to understand. The pressure acting on the piston 42 causes the displacement of the latter (notwithstanding the action of the spring 43) and, consequently, the displacement of the rack 36. The displacement of said rack causes the rotation of the movable unit of the electric transmitter.

The fluid-tightness of the system is ensured by the bellows 44.

The receiver of Figs. 4 to 7 comprises for instance a case 48 (of the embedding type) the front face 49 of which has an aperture 50 closed by a glass plate 51 behind which moves a drum 52 bearing a graduation 53, said drum 52 being rigid with the annular magnet 29 previously described.

If it is desired to obtain greater accuracy, it suffices to provide in the transmitter a gearing-up device which would cause the movable unit of said transmitter to effect a certain number of revolutions; a corresponding gearing-down device is then provided on the receiver, said gearing-down device being interposed between the movable unit (annular magnet 29) and the reading member (drum 52).

When the apparatus is adapted to be used on aeroplane engines which operate at very variable altitudes, it may be advantageous to eliminate the action of the variable atmospheric pressure on the device.

For that purpose, it suffices, as shown in Fig. 8, to arrange in front of the transmitter previously described (and which is diagrammatically shown in dot and dash lines in Fig. 8) a second cylinder 54 in which moves a piston 55 (having the same diameter as the piston 42) the rod 56 of which is connected to the rack 36, the piston 55 being rendered rigid with one end of a bellows 57 the other end of which is connected, in a fluid-tight manner, to the open bottom of the cylinder 54.

The action of atmospheric pressure being balanced on the pistons 42 and 55, the device becomes unresponsive to the variations of atmospheric pressure. Of course, the receiver must be graduated by taking into account the variation of the pressure of the air trapped in the closed enclosure of the cylinder 54.

It is to be understood that the device of Fig. 8 can serve for recording differential pressures, one of the pressures being admitted to the cylinder 40 and the other to the cylinder 54.

What I claim as my invention and desire to secure by Letters Patent is:

1. An electric indicating device for distant indication and the like, including a receiver adapted to cooperate with a transmitter, said receiver comprising a stationary group of electromagnetic cores radiating from a common center and exteriorly having arcuate pole pieces which together form a cylinder, a rotatably mounted annular polarized magnet surrounding said cylinder, there being coils upon said cores adapted to be connected to the transmitter, and an arcuate dial member secured to and rotatable with said annular polarized magnet exteriorly of and concentrically with said cylinder.

2. An electric indicating device according to claim 1, in which the dial member is drum shaped and surrounds the pole pieces forming the cylinder but out of contact therewith.

3. An electric indicating device according to claim 1, having a casing containing the same, and in which the dial member is drum shaped and surrounds the pole pieces forming the cylinder but out of contact therewith, the casing having a window exposing to view, a limited portion of the exterior peripheral surface of said dial member for reading the indicia thereon.

HENRI PITTET.